(12) United States Patent
Koeppel et al.

(10) Patent No.: US 8,270,929 B1
(45) Date of Patent: Sep. 18, 2012

(54) RF SHIELDING FOR MOBILE DEVICES

(75) Inventors: Richard P. Koeppel, Brookville, NY (US); Jessica Lynn Button, East Patchogue, NY (US); Ronald H. Koeppel, Brookville, NY (US)

(73) Assignee: Contech RF Devices, LLC, Amityville, NY (US)

( * ) Notice: Subject to any disclaimer, the term of this patent is extended or adjusted under 35 U.S.C. 154(b) by 0 days.

(21) Appl. No.: 13/229,206

(22) Filed: Sep. 9, 2011

(51) Int. Cl.
*H04B 1/10* (2006.01)

(52) U.S. Cl. ........ 455/300; 455/301; 455/271; 343/841; 361/816; 361/818

(58) Field of Classification Search ........... 455/1, 141.1, 455/271, 575.1, 90.3, 550.1, 575.9, 106, 455/300, 301, 317; 206/38, 38.1; 343/702, 343/841, 846; 361/816–818
See application file for complete search history.

(56) References Cited

U.S. PATENT DOCUMENTS

| | | | |
|---|---|---|---|
| 4,205,891 A * | 6/1980 | Rieman et al. | 439/565 |
| 4,831,210 A * | 5/1989 | Larson et al. | 174/386 |
| 5,335,366 A | 8/1994 | Daniels | |
| 5,336,896 A | 8/1994 | Katz | |
| 5,367,309 A | 11/1994 | Tashjian | |
| 5,657,386 A | 8/1997 | Schwanke | |
| 5,726,383 A | 3/1998 | Geller et al. | |
| 6,001,282 A | 12/1999 | Kanase | |
| 6,075,977 A | 6/2000 | Bayrami | |
| 6,095,820 A | 8/2000 | Luxon et al. | |
| 6,107,974 A * | 8/2000 | Votruba et al. | 343/787 |
| 6,184,835 B1 | 2/2001 | Chen et al. | |
| 6,341,217 B1 | 1/2002 | Wong | |
| 6,356,773 B1 | 3/2002 | Rinot | |
| 6,359,213 B1 | 3/2002 | Long | |
| 6,377,824 B1 | 4/2002 | Ingbir et al. | |
| 6,404,403 B1 | 6/2002 | Kunz et al. | |
| 6,505,036 B2 | 1/2003 | Zilberberg et al. | |
| 6,515,223 B2 | 2/2003 | Tashjian | |
| 6,603,981 B1 | 8/2003 | Carillo, Jr. et al. | |
| 6,615,028 B1 | 9/2003 | Loke et al. | |
| 6,624,432 B1 | 9/2003 | Gabower et al. | |
| 6,628,784 B1 | 9/2003 | Montane Condemines | |
| 6,708,047 B1 | 3/2004 | Miller et al. | |
| 6,738,650 B1 | 5/2004 | Zhou et al. | |
| 6,897,826 B1 | 5/2005 | Kunz | |
| 2001/0041545 A1 | 11/2001 | Liberman et al. | |
| 2002/0037757 A1 * | 3/2002 | Kaiponen et al. | 455/575 |
| 2002/0072337 A1 | 6/2002 | Teller | |
| 2002/0097188 A1 | 7/2002 | Coloney | |
| 2002/0126466 A1 * | 9/2002 | Suzuki et al. | 361/818 |
| 2003/0176164 A1 | 9/2003 | Hefetz | |
| 2003/0228843 A1 | 12/2003 | Mayer | |
| 2004/0026100 A1 | 2/2004 | Mattson et al. | |
| 2004/0119593 A1 * | 6/2004 | Kuhns | 340/572.7 |
| 2004/0196627 A1 * | 10/2004 | Lohman | 361/686 |

(Continued)

*Primary Examiner* — Dominic E Rego
(74) *Attorney, Agent, or Firm* — Scully, Scott, Murphy & Presser, P.C.

(57) ABSTRACT

An RF shielding device for application to mobile devices includes an RF blocking screen material configured to cover a front face of the mobile device. The screen material includes a grounding material that contacts a body portion of the mobile device for grounding the screen material to the mobile device. The RF shielding device allows proper operation of a touchscreen interface. The RF shielding device may be configured as a self-adhesive material dimensioned to cover a substantial portion of the front face of the mobile device. Alternatively, the RF shielding device may be constructed as a case or protective shell.

9 Claims, 3 Drawing Sheets

U.S. PATENT DOCUMENTS

| | | |
|---|---|---|
| 2004/0198264 A1 | 10/2004 | Saur et al. |
| 2005/0078048 A1* | 4/2005 | Delgado et al. ............... 343/872 |
| 2006/0044206 A1* | 3/2006 | Moskowitz et al. .......... 343/841 |
| 2006/0151207 A1* | 7/2006 | Redman et al. ............... 174/355 |
| 2006/0187061 A1* | 8/2006 | Colby ....................... 340/572.8 |
| 2007/0139181 A1* | 6/2007 | Eren et al. .................... 340/500 |
| 2007/0159804 A1* | 7/2007 | Taskila et al. ................. 361/818 |
| 2008/0014872 A1 | 1/2008 | Tucek et al. |
| 2008/0190526 A1* | 8/2008 | O'Shea ........................ 150/147 |
| 2009/0032300 A1* | 2/2009 | Joshi ............................ 174/377 |
| 2010/0044442 A1* | 2/2010 | Phillips ........................ 235/488 |
| 2010/0102966 A1* | 4/2010 | Skowronek et al. ....... 340/572.8 |
| 2010/0271186 A1* | 10/2010 | Tanaka et al. ................ 340/10.3 |
| 2011/0009733 A1* | 1/2011 | Susi ............................. 600/411 |
| 2011/0252843 A1* | 10/2011 | Sumcad et al. ................... 70/91 |
| 2011/0297581 A1* | 12/2011 | Angel .......................... 206/736 |

* cited by examiner

RF SHIELDING FOR MOBILE DEVICES

I. FIELD OF THE INVENTION

The present invention relates generally to mobile cellular, wireless or wifi device accessories, and more particularly to Radio-Frequency (RF) shielding for mobile devices.

II. BACKGROUND OF THE DISCLOSURE

During normal operation, mobile devices transmit radio-frequency (RF) radiation intermittently during standby periods and continuously during active talk periods. There is concern among public health professionals that the RF radiation emitted from mobile devices can cause a variety of health related issues including brain tumors.

In response to public concern over RF radiation from mobile devices, many devices and mobile device accessories have been marketed as blocking or reducing RF radiation. However, many of these products have drawbacks. For instance, some products are formed as cases to house the mobile device when not in use. However, when receiving or initiating a call, the mobile device will need to be removed from the protective case. Thus, exposing the user to the RF radiation. Other devices prevent the proper functioning of touch screen inputs on many current mobile devices.

Various attempts to reduce exposure to RF radiation from mobile devices are discussed in the following publications: U.S. Pat. No. 5,367,309, U.S. Pat. No. 5,335,366, U.S. Pat. No. 5,336,896, U.S. Pat. No. 5,657,386, U.S. Pat. No. 5,726,383, U.S. Pat. No. 6,001,282, U.S. Pat. No. 6,075,977, U.S. Pat. No. 6,095,820, U.S. Pat. No. 6,184,835, U.S. Pat. No. 6,341,217, U.S. Pat. No. 6,356,773, U.S. Pat. No. 6,359,213, U.S. Pat. No. 6,377,824, U.S. Pat. No. 6,404,403, U.S. Pat. No. 6,505,036, U.S. Pat. No. 6,515,223, U.S. Pat. No. 6,615,028, U.S. Pat. No. 6,624,432, U.S. Pat. No. 6,628,784, U.S. Pat. No. 6,603,981, U.S. Pat. No. 6,708,047, U.S. Pat. No. 6,738,650, U.S. Pat. No. 6,897,826, US Publication No. 2001/0041545, U.S. Publication No. 2002/0072337, U.S. Publication No. 2002/0097188, U.S. Publication No. 2002/0009976, U.S. Publication No. 2003/0228843, U.S. Publication No. 2003/0176164, U.S. Publication No. 2004/0198264, U.S. Publication No. 2004/0026100, U.S. Publication No. 2008/0014872, and U.S. Publication No. 2010/0240421.

III. SUMMARY OF THE DISCLOSURE

An object of the present invention is to provide an RF shielding that protects the mobile device user from potentially harmful RF radiation, while allowing touch screen equipped mobile devices to operate properly.

Another object of the present invention is to provide an RF shielding that protects the mobile device user from potentially harmful RF radiation, without hampering the ability of the mobile device to connect to cellular base stations.

An embodiment of the present invention is constructed of an RF material formed of a material configured to substantially attenuate RF radiation emitted by a mobile device; and an electrically conductive material electrically coupled to the RF material, the electrically conductive material configured to contact a grounding region of the mobile device.

An alternative embodiment the present invention is constructed of an RF material formed of a material configured to substantially attenuate RF radiation emitted by a mobile device; a frame adapted to hold the RF material in place against a front surface of the mobile device; and an electrically conductive material electrically coupled to the RF material, the electrically conductive material configured to contact a grounding region of the mobile device. The frame includes an opening formed on a first surface corresponding to a display area of the mobile device, the opening being covered by a portion of the RF material, and a void formed on a reverse side opposite to the first side, the void being dimensioned to holdingly receive the mobile device.

Another alternative embodiment of the present invention is constructed of an RF material formed of a material configured to substantially attenuate RF radiation emitted by a mobile device; a case adapted to hold the mobile device in an internal void; and an electrically conductive material electrically coupled to the RF material. The case has an opening formed on a first surface corresponding to a display area of the mobile device. The opening is covered by a portion of the RF material. The electrically conductive material is configured to contact a grounding region of the mobile device, and disposed in the internal void of the case.

IV. BRIEF DESCRIPTION OF THE DRAWINGS

These and other features, aspects, and advantages of the present invention will become better understood with regard to the following description, appended claims, and accompanying drawings wherein:

V. DETAILED DESCRIPTION OF DISCLOSURE

Figure 1:
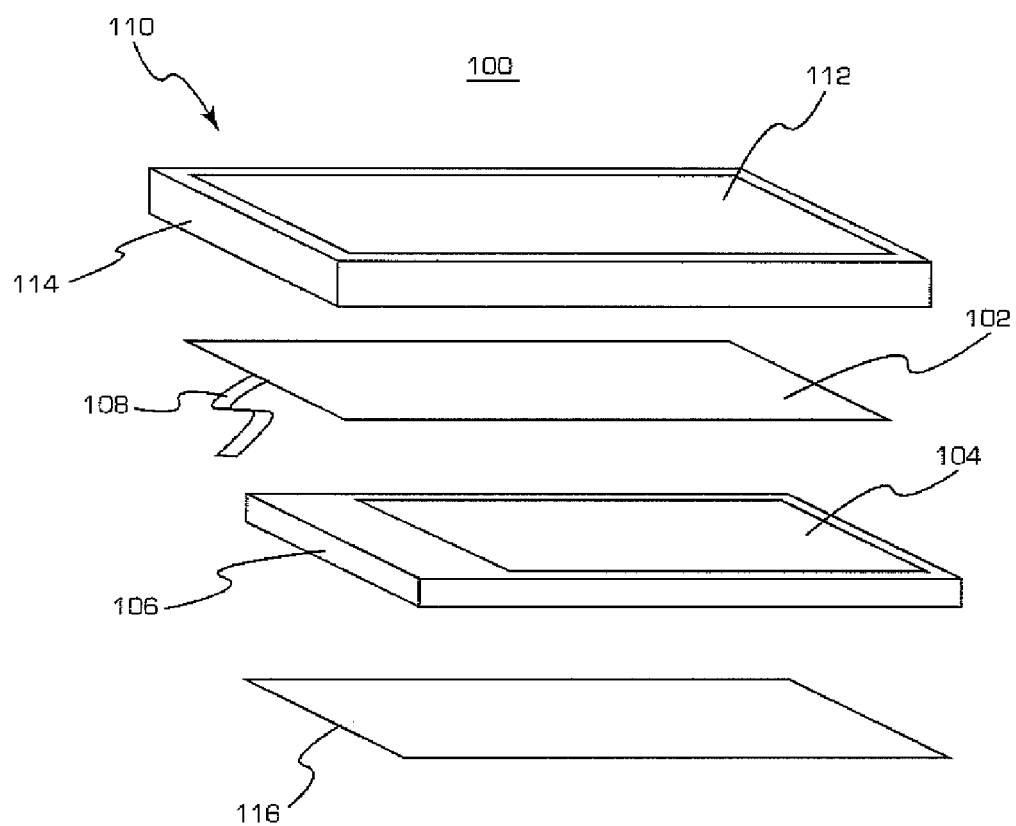
FIG. 1 illustrates an exploded view of an embodiment of the present invention.

Referring to FIG. 1, an embodiment of the present invention is shown in an exploded view. The RF shielding device 100 of the present invention is constructed of an RF material 102 dimensioned to overlay a front face 104 of a mobile device 106.

In order to maintain functionality of a touch screen of the mobile device 106, the RF material 102 is constructed with an electrically conductive grounding material 108 disposed at a periphery of the RF material 102. The grounding material 108 is configured to contact at least a portion of the mobile device 106. The grounding material 108 is constructed of a material, such as metallic foil, which provides electrical grounding of the RF material 102 to the mobile device 106.

The RF material 102 is constructed of a nickel-copper screen, such as RadioScreen™ or VeilShield™, with a protective clear plastic coating disposed on at least the front surface of the screen, i.e., the surface of the screen that would be in contact with a person's skin when the mobile device is actively in use.

In another embodiment, both the front and rear surfaces of the screen are coated with a protective plastic material. The plastic coating on the front surface is intended to prevent reactions by persons with nickel allergies when the mobile device is in prolonged contact with an allergic person's skin. The plastic coating disposed on the rear surface, i.e. the surface in direct contact with the front face 104 of the mobile device 106, is provided to protect the surface of the mobile device from abrasion by the nickel-copper screen.

While the present invention is described with reference to a nickel-copper screen as the RF material 102, other materials, such as silver, stainless steel, other metals, metal alloys, and plastics, having similar RF opacity in the frequency range utilized by mobile devices, for example GHz range frequencies can be utilized. Additionally, RF blocking inks and paints may be used as well, where the inks or paints are applied to a surface of a material that would otherwise be transparent to RF radiation.

The screen size used is in part dependent on the particular range of RF radiation intended to be blocked. Methods for calculating the proper screen size is well known in the art of RF engineering and thus will not be discussed herein. Moreover, the screen size of the screen of the RF material 102 is also required to provide sufficient optical transparency in the visual frequency range to allow viewing of the display on the mobile device 102 without removal.

Alternatively, the RF material may be formed of a flexible plastic material onto which metallic particles are deposited throughout the surface of the plastic material either as wires or randomly distributed at a density calculated to provide a desired attenuation of the RF radiation emitted by the mobile device.

In the embodiment shown in FIG. 1, the RF material 102 is held against the mobile device 106 front face 104 by a frame 110. The frame has a centrally formed opening 112 corresponding to the dimensions of the display and any buttons disposed on the front face 104 of the mobile device 106. The sides 114 of the frame 110 are dimensioned to extend to a point beyond a rear surface of the mobile device 106 when the mobile device 106 is seated in the frame 110.

The frame 110 is further configured to holdingly engage with a backplate 116 to form a closed shell around the mobile device 106. Thus, the RF shielding device 100 of the present embodiment encases the mobile device 106 between the frame 110 and the backplate 116. Moreover, the backplate 116 is constructed of a substantially RF opaque material. The material used for constructing the backplate 116 may be identical to the material forming the screen used in the RF material 102. However, other RF opaque materials may be used as well. Additionally, the backplate 116 is not required to have any optical transparency.

In the present invention substantially RF opaque materials are defined as materials, which block a portion of RF radiation above a defined threshold, where the defined threshold is determined by the manufacturer of the RF shielding device of the present invention. Consequently, a substantially RF opaque material is one that reduces, or attenuates, the transmission of RF radiation there through by greater than 50%, and more desirable greater than 75%, of the original unattenuated radiation transmission.

Similarly, substantially RF transparent materials are defined herein as materials, which allow a portion of RF radiation above a defined threshold to radiate through the material, where the defined threshold is determined by the manufacturer of the RF shielding device of the present invention. Consequently, a substantially RF transparent material is one that reduces, or attenuates, the transmission of RF radiation therethrough by less than 50%, and more desirable less than 25%, of the original unattenuated radiation transmission.

Consequently, the backplate 116 further blocks RF radiation from being emitted by the mobile device 106 through the rear surface of the mobile device 106. The backplate 116 may be joined with the frame 110 by a series of tabs (not shown) disposed on the rear surface of the frame 110. The backplate 116 would be configured to snap into the tabs. Alternatively, the frame 110 may be formed with a set of rails (not shown) along the rear surface into which the backplate 116 can be slid. In this case, the backplate 116 is held in place by the frictional force provided by the rails. These, and other appropriate structures and means for joining the frame 110 and backplate 116, are well known in the art.

In order to allow the mobile device to communicate with a cellular base station, at least a portion of the side surfaces of the frame 110 is fabricated of a material that is substantially RF transparent. Additionally, the RF screening material does not extend beyond the perimeter of the front face 104 of the mobile device 106. In this way, the mobile device is able to communicate with a base station by way of RF signals emitted through at least a portion of the side surfaces of the RF shielding device 100.

Alternatively, the mobile device 106 is held within the frame 110 by means of tabs or straps disposed at a bottom edge of the sides 114. In this case the RF shielding device 100 may not include the backplate 116. In this alternative, the mobile device is prevented from emitting RF radiation into the brain of a user, while maximizing the receiving and transmitting surface of the mobile device.

In another embodiment of the present invention, the RF shielding device 100, as shown in FIG. 1, is modified to provide a hinge at a rear side surface of the frame 110 to which the backplate 116 is attached. In this way, the RF shielding device 100 is configured as a clamshell with the frame 110 and backplate 116 forming the enclosing shell around the mobile device 106. To insert the mobile device 106 into the clamshell RF shielding device 100, the backplate 116 can be rotated about the hinge connection axis to separate the backplate 116 from the frame 110.

Figure 2:
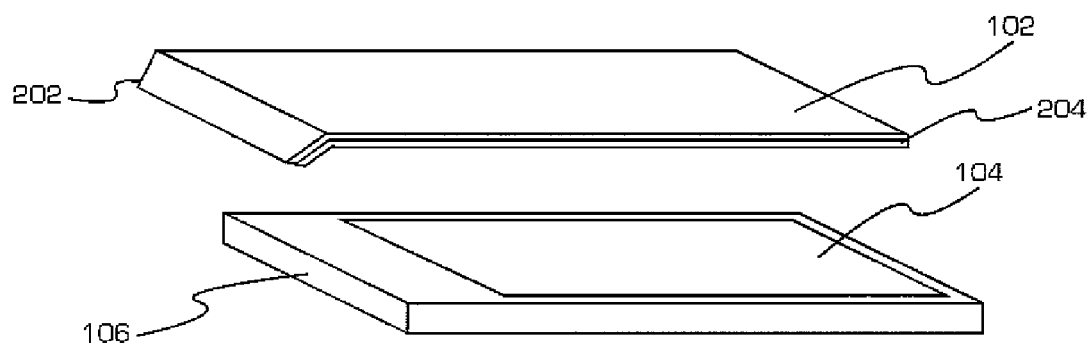
FIG. 2 illustrates an alternative embodiment of the present invention.

The RF material 102 can be configured as an adhesive backed screen protector in which the surface of the RF material 102 in contact with the front face 104 has an adhesive 204 disposed thereon. In such a configuration, the remaining components of the RF shielding device 100 are not necessary. The grounding of the RF screen 102 in this case can be accomplished by a grounding material 202 disposed along at least a portion of the perimeter of the RF material 102 as shown in FIG. 2. The grounding material 202 is configured to adhere to a side surface of the mobile device 106. Thus, providing a grounding contact between the RF material 102 and the body of the mobile device 106.

Figure 3:
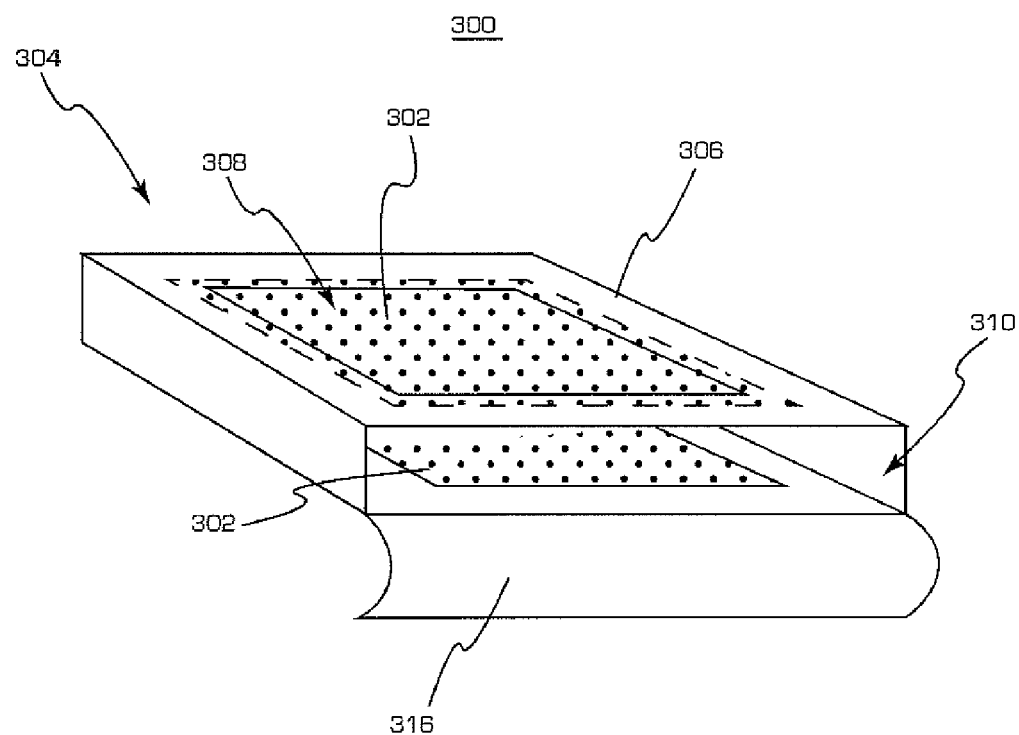
FIG. 3 illustrates an alternative embodiment of the present invention

In another embodiment, shown in FIG. 3, the present invention is configured as a case, or pouch, 300. In the present embodiment, the case 300 is constructed with a layer of RF material 302, which lines a portion of the inside of the case 300. The case main body 304 is constructed of a plastic, a fabric or other similar material, such as leather, nylon, neoprene, and rubber. The main body 304 is formed into a shape conforming to the silhouette of the mobile device 106.

The main body 304 is formed, at a front surface 306, with an opening 308 through which a portion of the RF material 302 is exposed. Additionally, at a second side 310 laying perpendicular to the front surface 306, the main body 304 has a second opening 310 dimensioned to slidingly accommodate insertion of the mobile device 106 into an interior void formed by the main body 304. A flap 316, configured to removable hold the mobile device 106 in the case 300, may be provided on the main body 304 as well.

Additionally, the case 300 may be equipped with a clip (not shown) allowing a user to fasten the case 300 to a belt, pocket, etc.

In an alternative embodiment of the present invention, the RF shielding device is disposed inside a mobile device. In such an embodiment, the RF material can be disposed in front of a touchscreen of the mobile device as described above. Alternatively, the RF material may be disposed behind the touchscreen of the mobile device, such that the touchscreen is directly contactable by a user of the mobile device. The grounding material couples the RF material to a grounding portion of the mobile device located inside the mobile device.

In the case where the RF material is placed in front of the touchscreen, the RF material must be constructed of a material that allows viewing of the touchscreen. On the other hand, if the RF material is placed behind the touchscreen, the materials are not required to be optically transparent.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. An RF shielding device for mobile devices, the device comprising:
   an RF material formed of a material configured to substantially attenuate RF radiation emitted by a mobile device;
   a frame configured to hold the RF material in place against a front surface of the mobile device, the frame having:
      an opening formed on a first surface corresponding to a display area of the mobile device, the opening being covered by a portion of the RF material, and
      a void formed on a reverse side opposite to the first side, the void being dimensioned to holdingly receive the mobile device; and
   an electrically conductive material electrically coupled to the RF material, the electrically conductive material configured to contact a grounding region of the mobile device.

2. The device as in claim 1, wherein at least a portion of the frame is formed of a material substantially transparent to RF radiation emitted and received by the mobile device.

3. The device as in claim 1, wherein the frame is formed with tabs configured to hold the mobile device within the frame.

4. The device as in claim 1, further comprising a backplate configured to join with the frame, the frame and backplate forming a closed shell around the mobile device when joined.

5. The device as in claim 4, wherein the backplate is formed of a material substantially opaque to RF radiation emitted by the mobile device.

6. The device as in claim 1, wherein the frame is formed as a case having a second opening on a side dimensioned to accommodate sliding a mobile device into the void.

7. The device as in claim 1, wherein the RF material is formed of materials selected from: metals, metal alloys, and plastics.

8. The device as in claim 7, wherein the RF material is formed of a nickel-copper alloy.

9. The device as in claim 8, wherein the RF material is formed of a screen allowing visibility of a display of the mobile device.

* * * * *